US012809967B2

(12) United States Patent
Belair et al.

(10) Patent No.: US 12,809,967 B2
(45) Date of Patent: Nov. 24, 2026

(54) METHOD AND MODULE FOR INSTALLING A MITIGATION PROGRAM IN THE KERNEL OF A COMPUTING DEVICE

(71) Applicant: Orange, Issy-les-moulineaux (FR)

(72) Inventors: Maxime Belair, Châtillon (FR); Sylvie Laniepce, Châtillon (FR)

(73) Assignee: ORANGE, Issy-les-Moulineaux (FR)

(*) Notice: Subject to any disclaimer, the term of this patent is extended or adjusted under 35 U.S.C. 154(b) by 266 days.

(21) Appl. No.: 18/548,692

(22) PCT Filed: Feb. 24, 2022

(86) PCT No.: PCT/FR2022/050340
§ 371 (c)(1),
(2) Date: Sep. 1, 2023

(87) PCT Pub. No.: WO2022/184998
PCT Pub. Date: Sep. 9, 2022

(65) Prior Publication Data

US 2024/0152602 A1 May 9, 2024

(30) Foreign Application Priority Data

Mar. 2, 2021 (FR) ....................................... 2102026

(51) Int. Cl.
*G06F 21/54* (2013.01)
*G06F 21/57* (2013.01)

(52) U.S. Cl.
CPC .............. *G06F 21/54* (2013.01); *G06F 21/57* (2013.01); *G06F 2221/033* (2013.01)

(58) Field of Classification Search
None
See application file for complete search history.

(56) References Cited

U.S. PATENT DOCUMENTS 7,845,006 B2 * 11/2010 Akulavenkatavara ........................ G06F 11/3644 710/266
8,468,595 B1 * 6/2013 Huang .................. G06F 21/602 726/13

(Continued)

FOREIGN PATENT DOCUMENTS

| | | | | |
|---|---|---|---|---|
| CN | 109409096 A | | 3/2019 | |
| WO | WO-2015117434 A1 | * | 8/2015 | ............. G06F 8/658 |
| WO | WO-2017166446 A1 | * | 10/2017 | ........... G06F 21/577 |

OTHER PUBLICATIONS

âDynamic linkerâ article from Wikipedia, sourced Feb. 21, 2021, https://web.archive.org/web/20210221213948/https://en.wikipedia.org/wiki/Dynamic_linker (Year: 2021).*

(Continued)

*Primary Examiner* — Catherine Thiaw
*Assistant Examiner* — Amir Mahdi Hajiabbasi
(74) *Attorney, Agent, or Firm* — Knobbe, Martens, Olson & Bear, LLP

(57) ABSTRACT

A method installs a mitigation program in the kernel of a computing device to mitigate a vulnerability liable to affect a function to be protected running in a user space of the computing device (EQ). The method includes sending a request containing a unique identifier of the vulnerability to a security server, obtaining, in response to the request, a description file describing the program, obtaining an object code for the mitigation program identified in the description file, publishing a link to resolve at least one symbol of the object code in order to generate an executable code for the mitigation program specific to the device, and installing the executable code in the kernel of the device. The device includes means for ensuring that the mitigation program mitigates the vulnerability only for that function to be protected.

13 Claims, 6 Drawing Sheets

(56) References Cited

U.S. PATENT DOCUMENTS

| | | | | |
|---|---|---|---|---|
| 10,747,875 | B1 * | 8/2020 | Stoler | H04L 9/3247 |
| 12,244,621 | B1 * | 3/2025 | Kapoor | H04L 43/045 |
| 2002/0059475 | A1 * | 5/2002 | Baentsch | G06F 9/44521<br>719/332 |
| 2005/0229256 | A2 * | 10/2005 | Banzhof | G06F 21/577<br>726/25 |
| 2006/0277539 | A1 * | 12/2006 | Amarasinghe | G06F 21/54<br>717/168 |
| 2008/0172658 | A1 * | 7/2008 | Russell | G06F 9/45516<br>717/138 |
| 2013/0205415 | A1 * | 8/2013 | McKee | G06F 8/24<br>717/165 |
| 2013/0347104 | A1 * | 12/2013 | Raber | G06F 21/55<br>726/22 |
| 2014/0101769 | A1 * | 4/2014 | Tripp | G06F 16/9024<br>726/25 |
| 2014/0109226 | A1 * | 4/2014 | Diehl | G06F 21/554<br>726/22 |
| 2015/0020066 | A1 * | 1/2015 | Kirk | G06F 9/455<br>718/1 |
| 2015/0096018 | A1 * | 4/2015 | Mircescu | G06F 21/577<br>726/23 |
| 2015/0271142 | A1 * | 9/2015 | Oliphant | H04L 63/02<br>726/12 |
| 2016/0259944 | A1 * | 9/2016 | Okihara | G06F 21/552 |
| 2019/0303585 | A1 * | 10/2019 | Ofek | G06F 21/577 |
| 2019/0311115 | A1 * | 10/2019 | Lavi | G06F 21/604 |
| 2020/0274952 | A1 * | 8/2020 | Waskiewicz | H04L 69/22 |
| 2020/0342106 | A1 * | 10/2020 | Chelarescu | G06F 11/1662 |
| 2021/0026947 | A1 * | 1/2021 | Korotaev | G06F 9/4856 |

OTHER PUBLICATIONS

âInclude directiveâ article from Wikipedia, sourced Feb. 19, 2021, https://web.archive.org/web/20210219204432/https://en.wikipedia.org/wiki/Include_directive (Year: 2021).*

âLinker (computing)â article from Wikipedia, sourced Feb. 28, 2021, https://web.archive.org/web/20210228123247/https://en.wikipedia.org/wiki/Linker_(computing) (Year: 2021).*

International Search Report and Written Opinion dated May 6, 2022 for Application No. PCT/FR2022/050340.

Graf Thomas. “eBPF - Rethinking the Linux Kernel”, www.infoq.com, Dec. 4, 2020 (Dec. 4, 2020), Retrieved from the Internet: https ://web.arc hi ve.org/web/2020120423 2413 /https://www.infoq.com/presentations/facebook-google-bpf-linux-kernel/ [retrieved on Nov. 5, 2021].

Anonymous. “D4.3 Runtime Risk Assessment. Resilience and Mitigation Planning First Release” Dec. 29, 2020 (Dec. 29, 2020). Retrieved from the Internet: https ://web.arc hive.org/web/20201229080416/https://futuretpm.eu/downloads/FutureTPM-D.4.3-Runtime-RA-Resilience-Mitigation-Plan-I st-Release-PU-M 18.pdf.

* cited by examiner $ID_{Fk}$

| OPS | LMS1 |
|---|---|
| oper_open ( ) | ✓ |
| oper_send ( ) | |

METHOD AND MODULE FOR INSTALLING A MITIGATION PROGRAM IN THE KERNEL OF A COMPUTING DEVICE

RELATED APPLICATIONS

This application is the U.S. National Phase of Application No. PCT/FR2022/050340 entitled "METHOD AND MODULE FOR INSTALLING A MITIGATION PROGRAM IN THE KERNEL OF A COMPUTING DEVICE" and filed Feb. 24, 2022, which claims the benefit of French Patent Application No. 2102026, filed Mar. 2, 2021, each of which is incorporated by reference in its entirety.

The invention relates to the general field of the security of computer software.

The invention more particularly relates to a method for installing, in the kernel of computing equipment, a program configured to mitigate a given vulnerability that may affect the behavior of software running in the user space of this equipment.

It is recalled that when software has a vulnerability, the mitigation does not aim to correct this software, which continues to run normally, but to block the effects of the vulnerability. For example, if a software has a security flaw when it makes a system call to a packet sending function, a mitigation of this vulnerability can consist in blocking the packet sending process. The mitigation does not remove the vulnerability but it makes it unexploitable.

In the field of computer security, security flaws are listed in a public list accessible at the address https://cve.mitre.org/, each vulnerability referenced in the list being identified by a unique CVE (Common Vulnerabilities and Exposures) identifier.

Thousands of CVE identifiers are issued each year, and complex software can accumulate hundreds of CVEs.

The management of the CVEs to maintain the security of a computing equipment can therefore be overly complex.

The invention aims to facilitate the installation of a program in the kernel of a computing equipment to mitigate a vulnerability impacting software running on this equipment and performing a function to be protected.

More specifically, and according to a first aspect, the invention relates to a method for installing a mitigation program in the kernel of a computing equipment to mitigate a vulnerability that may affect a function to be protected running in a user space of said computing equipment, this method including:

- a step of sending a request including a unique identifier of said vulnerability to a security server;
- a step of obtaining, in response to the request, a description file for describing said program;
- a step of obtaining an object code of the mitigation program identified in said description file;
- a step of editing a link to resolve at least one symbol of the object code in order to generate an executable code of the mitigation program specific to said equipment; and
- a step of installing the executable code in the kernel of said equipment, said equipment including means to ensure that said mitigation program mitigates said vulnerability only for said function to be protected.

Correlatively, the invention relates to a module for installing a mitigation program in the kernel of a computing equipment to mitigate a vulnerability that may affect a function to be protected running in a user space of said computing equipment, this module including:

- a sub-module for sending a request including a unique identifier of said vulnerability to a security server;
- a sub-module for obtaining, in response to the request, a description file for describing said program;
- a sub-module for obtaining an object code of the mitigation program identified in said description file;
- a sub-module for editing a link to resolve at least one symbol of the object code in order to generate an executable code of the mitigation program specific to said equipment; and
- a sub-module for installing the executable code in the kernel of said equipment, said equipment including means to ensure that said mitigation program mitigates said vulnerability only for said function to be protected.

Thus, firstly, the invention proposes a mechanism for distributing mitigation programs intended to be installed in the kernels of computing equipments. In this sense, the security server proposed by the invention can be considered as a distribution platform (store) for distributing mitigation programs.

It is important to note that the mitigation program is loaded in the kernel and not in a kernel module, namely a module isolated from the kernel, and dedicated to specific functions.

It is not necessary to restart the kernel for the mitigation program to be effective.

In accordance with the invention, the mitigation program loaded in the kernel is an executable program. It is not a simple signature or a simple set of rules.

Very advantageously, the invention proposes to download the appropriate mitigation program when a vulnerability affecting software running on the computing equipment has been detected, and to automatically install this program in the kernel of the equipment to mitigate this vulnerability for the concerned software, and only for this one.

As known to those skilled in the art, a mitigation program is an example of a particular security policy dealing with mitigation corrections.

Very advantageously, the mitigation program can be loaded without privileged administration rights. This characteristic is particularly advantageous because the LSM modules (Linux Security Module) require that security policies are set up by an entity of the user space with administrative rights.

In one particularly advantageous manner, the mitigation programs can be loaded including "hot" loaded, that is to say during the execution of the vulnerable software.

In one particular embodiment, the installation method according to the invention includes:

- a step of downloading a source code of said mitigation program from an address comprised in said description file; and
- a step of compiling said source code to obtain said object code.

In one particular embodiment, the source code is in eBPF (Extended Berkeley Packet Filter) language. As is known, this language is deliberately limited in terms of functionalities (no loops, no pointer arithmetic, no direct access to kernel structures, . . . ) but has strong security properties so that it is unable to attack the rest of the system.

This characteristic advantageously makes it possible to prevent the critical attacks, for example to recover information, modify the integrity or the availability of the rest of the system.

The proposed technique thus makes it possible to set up mitigation programs without compromising the security of the system, including after the initialization of the software performing the function to be protected. This makes it possible to block, after the initialization of the software to be protected, behaviors that it is necessary to authorize for the initialization of the software.

In one particular embodiment, the installation method includes a step of downloading said object code from an address comprised in said description file.

In one particular embodiment, the description file for describing the mitigation program includes the identifier of at least one support function that can be called by the mitigation program when executed by a processor of said equipment.

This embodiment overcomes the intrinsic limitations of the eBPF language.

These support functions (helpers) can be "hot" loaded, that is to say during the execution of the kernel. They can be called by an eBPF security policy, and particularly by a mitigation program, to perform critical processing operations such as access to kernel structures for the eBPF code. They are external to the mitigation programs and must be loaded into the kernel by an entity of the user space with administrative rights.

This particular embodiment allows, by moving the critical accesses and the complex processing operations to the support functions, the set up of elaborate policies without compromising the security of the system and with low additional performance costs.

In one particular embodiment, the installation method includes, before said link editing step, a step of verifying that said at least one support function is installed in said kernel.

In one particular embodiment, this verification step includes the verification of a hash of said support function comprised in said description file.

This embodiment makes it possible to ensure, before the installation of the mitigation program in the kernel, that all the necessary support functions are indeed present. This avoids installing ineffective mitigation programs and further strengthens the security mechanism.

In one particular embodiment, the source code of the mitigation program includes a static function for calling said support function, the call to said static function being replaced by a call to a dynamic function during said link editing step.

In one particular embodiment, said link editing step uses a header file configured to allow the substitution of a unique identifier obtained from the identifier of the support function by an index representative of the location of the support function in the kernel of the equipment.

In one particular embodiment, this unique identifier includes a hash of the support function.

In one particular embodiment, the installation method includes:

- a step of recording said mitigation program as a security policy in a kernel namespace dedicated to security management, this namespace being associated with at least one process of the function to be protected, and
- said kernel implements a security method for securing a system call triggered by a current process of said user space before executing at least one operation, typically an LSM (Linux Security Module) operation triggered by said at least one system call, said security method including:
- a step of obtaining at least one kernel namespace dedicated to security management associated with said current process;
- a step of determining whether said at least one namespace includes a security policy; and
- a step of executing said security policy.

Correlatively, the invention relates to equipment including a user space, a kernel and a module as mentioned above for installing a mitigation program in the kernel to mitigate a vulnerability that may affect a function to be protected running in the user space, this equipment including:

- a module for recording said mitigation program as a security policy in a kernel namespace dedicated to security management, this namespace being associated with at least one process of said function to be protected;
- means of said kernel for securing at least one system call triggered by a current process of said user space before executing at least one operation triggered by said at least one system call, said means being configured to:
- obtain at least one kernel namespace dedicated to security management associated with said current process;
- determine whether said at least one namespace includes a security policy; and
- execute said security policy.

The protection of a system call can more particularly consist in protecting the accesses (read/create/modify/delete, etc.) to sensitive kernel resources (inodes, files, etc.) which can be triggered in the code of the system call from the user space, for example, to manage the sensitive operations of opening a file, sending a package, creating an "inode", . . . .

This embodiment of the invention finds a preferred application in the Linux environment but can be applied to any operating system offering a mechanism for isolating the resources by namespace. This security mechanism proposes to associate the security policies with a kernel namespace instead of integrating the policy into the LSM module itself. This characteristic very advantageously makes it possible to benefit from all the mechanisms for managing the namespaces of the kernel.

In this embodiment, the mitigation program is associated with a namespace dedicated to security management associated with an operation likely to be triggered by a system call from a process of the vulnerable software function.

In one particular embodiment, the kernel includes a security control infrastructure and a security module, this infrastructure being configured to execute the mitigation program before executing at least one operation triggered by the system call.

In one embodiment, the security method determines whether the namespace of the current process includes at least one ancestor. If this is the case, the method (or the device) implements for each of these ancestor namespaces, a processing identical to the one implemented for the namespace associated with the current process.

More specifically, in this embodiment, the method includes:

- a step of obtaining the namespace(s) dedicated to security management and the ancestor(s) of the namespace of the current process;
- a step of determining whether this or these namespace(s) include(s) a security policy associated with the operation and recorded in a region of the kernel;
- a step of executing of this security policy; and
- a step of processing the system call according to a result of this execution.

Advantageously, a mitigation program cannot be disabled or modified from the user space, particularly by a software stack or a container belonging to a namespace for which this policy has been defined.

The installation method is implemented by a computer program.

Consequently, the invention also relates to a computer program on a recording medium, this program being capable of being implemented in a computing equipment or more generally in a computer. This program includes instructions allowing the implementation of a method as described above.

This program may use any programming language, and be in the form of source code, object code, or intermediate code between source code and object code, such as in partially compiled form, or in any other desirable form.

The invention also relates to an information medium or a recording medium readable by a computer, and including instructions of a computer program as mentioned above.

The information or recording medium can be any entity or device capable of storing the programs.

For example, the media can include a storage means, such as a ROM, for example a CD ROM or a microelectronic circuit ROM, or a magnetic recording means, for example a hard disk or a flash memory.

On the other hand, the information or recording medium may be a transmissible medium such as an electrical or optical signal, which may be routed via an electrical or optical cable, by radio link, by wireless optical link or by other means.

The program according to the invention can be particularly downloaded from an Internet-type network.

Alternatively, the information or recording medium may be an integrated circuit in which a program is incorporated, the circuit being adapted to execute or to be used in the execution of one of the methods as described above.

Other characteristics and advantages of the present invention will become apparent from the description given below, with reference to the appended drawings which illustrate an exemplary embodiment devoid of any limitation. On the figures.

Figure 1:
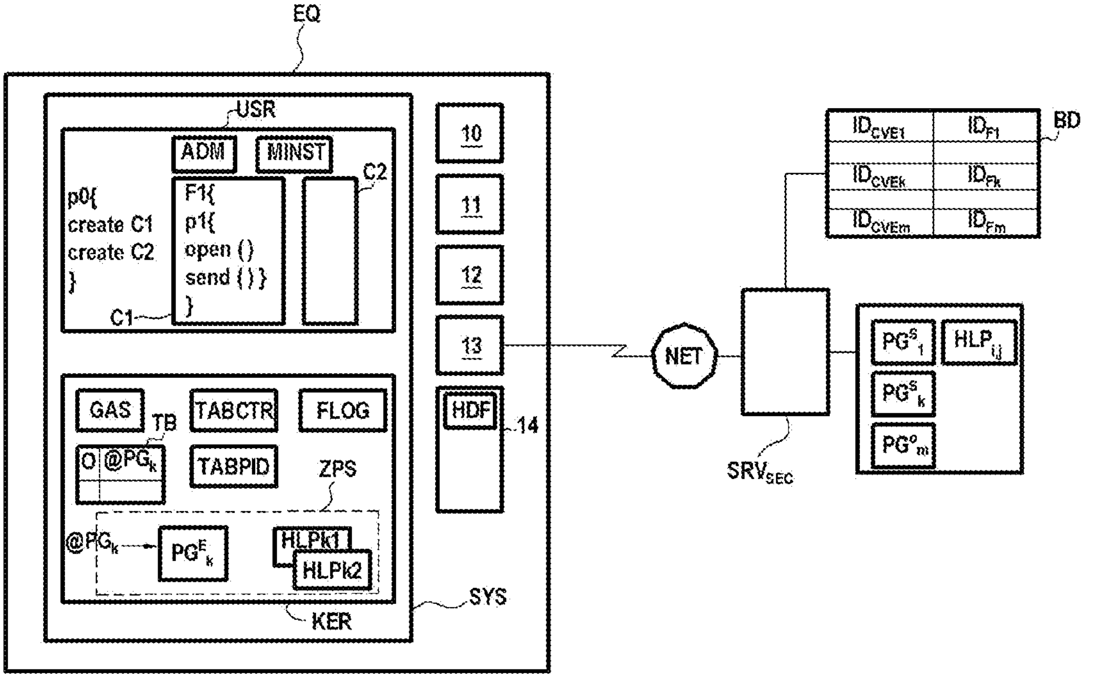
FIG. 1 represents a system including an installation module in accordance with one particular embodiment.

FIG. 1 represents a computing equipment EQ of a user, for example a server. In the exemplary embodiment described here, this equipment EQ has the hardware architecture of a computer. It includes in particular a processor 10, a random access memory of the RAM type 11, a read only memory of the ROM type 12, communication means 13 and a non-volatile rewritable memory, for example a hard disk 14.

The equipment EQ is configured to be able to communicate with a security server $SERV_{SEC}$ via a communication network NET. This security server $SERV_{SEC}$ includes a database BD including a set of CVE vulnerability identifiers and in association with each of these vulnerability identifiers $ID_{CVEi}$, the identifier IDF; of a description file for describing a program PG; configured to run in the kernel of an equipment and to implement a security policy able to mitigate the vulnerability identifier $ID_{CVEi}$.

For simplicity, the programs PG; are hereafter referred to as "mitigation programs PG;" or "vulnerability mitigation programs $ID_{CVEi}$;".

The mitigation programs $PG_i$ can be downloaded by the equipment EQ from the security server $SERV_{SEC}$.

A vulnerability identifier $ID_{CVEi}$, is for example of the form CVE-AAAA-IIII, where AAAA is the year of publication and IIII a unique number.

In the embodiment described here, the mitigation programs $PG_i$ that can be downloaded from the security server $SERV_{SEC}$ are source files in eBPF language, denoted $PG^S_i$.

In another embodiment described here, the mitigation programs $PG_i$ downloadable from the security server $SERV_{SEC}$ are object files denoted $PG^O_i$, obtained by compilation of source files $PG^S_i$ in eBPF language.

In the embodiment described here, the description files are in JSON (Java Script Object Notation) format.

In the exemplary embodiment described here, the description file $ID_{Fi}$ for describing a mitigation program $PG_i$ includes:

- in a field "$ID_{VUL}$", the identifier $ID_{CVEi}$, of the vulnerability that this program can mitigate; and
- in a structure "META_PG" of the metadata of the mitigation program $PG_i$.

In the embodiment described here, the metadata of the mitigation program $PG_i$ include:

- a metadata "NP" corresponding to the name of this program PG; and
- at least one metadata "HK" corresponding to a trigger point (hook) of this program.

In the embodiment described here, a mitigation program $PG_i$ can call at least one support function (or dependency, helper) $HLP_{i,j}$.

In the exemplary embodiment described here, when a program $PG_i$ calls at least one support function $HLP_{i,j}$;

- the description file IDF, includes, in a "META_HLP" structure, metadata for this support function $HLP_{i,j}$; and
- these support functions $HLP_{i,j}$ can be downloaded from the security server $SERV_{SEC}$.

In the embodiment described here, the META_HLP metadata of a support function $HLP_{i,j}$ include:

- a metadata "NH" corresponding to the name of this support function;
- a metadata "HSH" corresponding to a hash of this support function; and
- a metadata "EP" corresponding to an entry point of the function.

The equipment EQ includes a software system SYS, this system including a kernel or operating system KER, and a user space USR. In the embodiment described here, the operating system KER is of the Linux (registered trademark) type.

Figure 2:
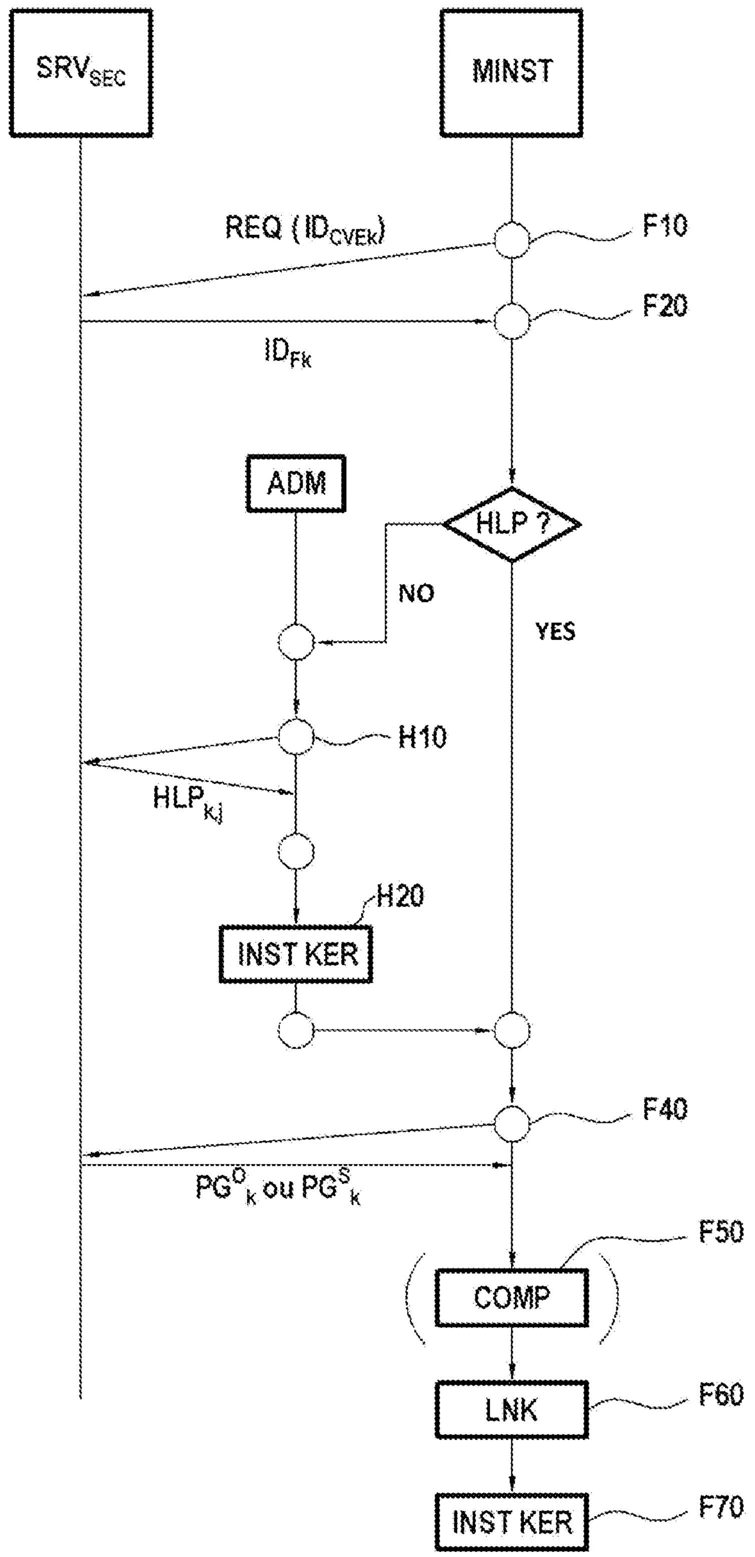
FIG. 2 represents in the form of a flowchart the main steps of an installation method in accordance with one particular embodiment.

The user space USR includes an installation module MINST in accordance with the invention. This installation module is configured to implement an installation method in accordance with the invention, and whose main steps are represented in the form of a flowchart in FIG. 2.

In the example described here, the user space USR includes:

- a process p0( ) and two containers C1, C2 associated with user level rights; and

- an administration tool ADM associated with administrator level rights.

In the rest of the description, a software function F1 installed in the container C1 of the user space USR is considered. In the example described here, this software function F1 implements a single process p1 which calls:

- a file opening system call open( ); and
- a packet sending system call send( ).

It is considered in this example:

- that the file opening system call open( ) generates an operation oper_open( ) during its execution;
- that the packet sending system call send( ) generates an operation oper_send( ) during its execution; and
- the file opening and packet sending operations oper_open( ) and oper_send( ) are sensitive operations in the sense of Linux Security Modules (LSM).

The kernel KER includes a system call manager GAS that references the implementation of these system calls.

In the rest of the description, it is considered that it has been determined that the function F1 was vulnerable and that this vulnerability has the unique identifier $ID_{CVEk}$.

During a step F10 of the installation method, the installation module MINST sends a request REQ to the server $SRV_{SEC}$, this request REQ including the vulnerability identifier $ID_{CVEk}$.

During a step F20, the installation module MINST receives, in response to the request REQ, the description file whose identifier $ID_{Fk}$ is associated with the vulnerability identifier $ID_{CVEk}$ in the database BD.

Figure 3:
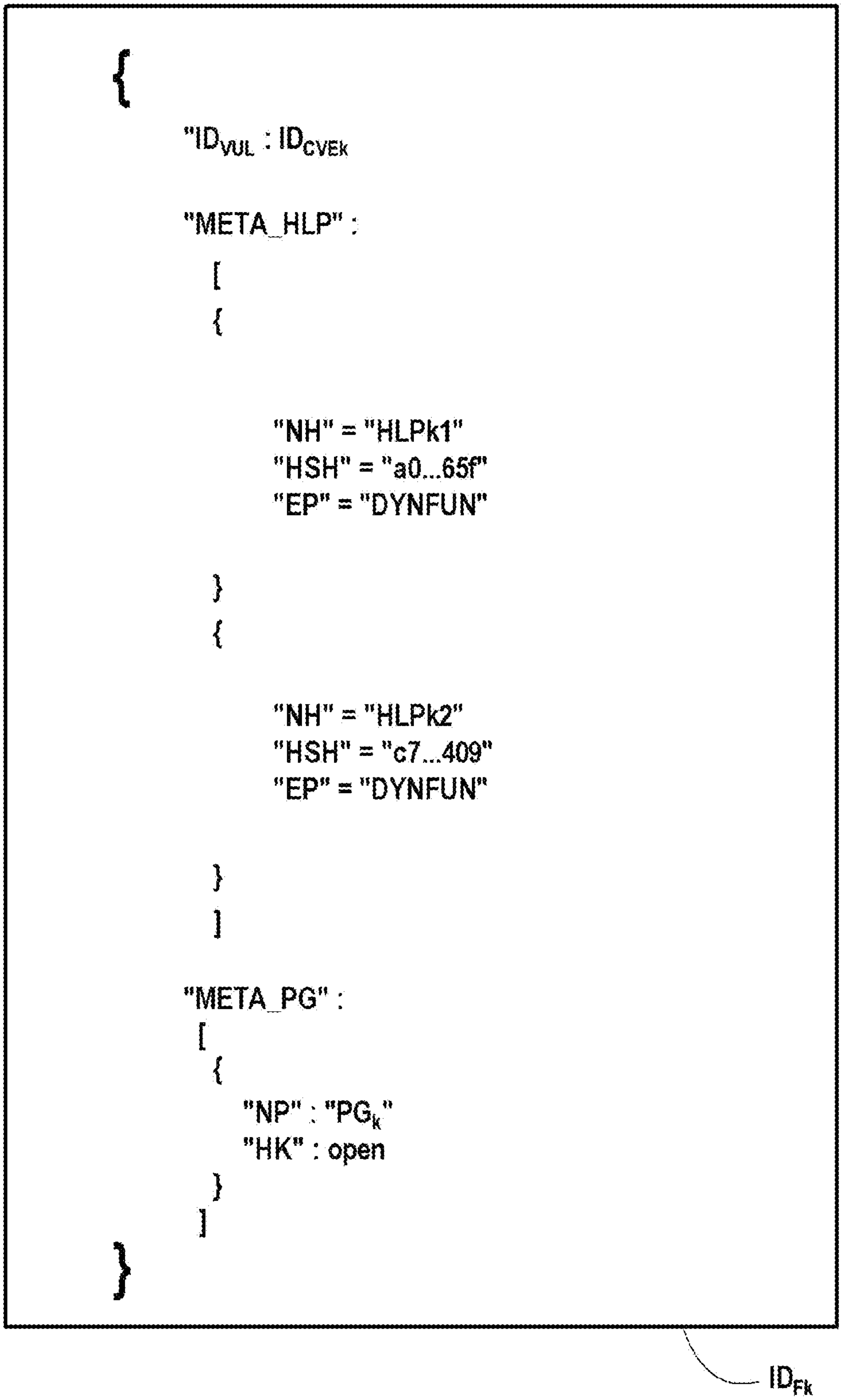
FIG. 3 represents a description file for describing a mitigation program that can be used in one particular embodiment.

This description file $ID_{Fk}$ is represented in FIG. 3.

In the exemplary embodiment described here, the description file $ID_{Fk}$ includes:

- in the "$ID_{VUL}$" field, the identifier $ID_{CVEk}$ of the vulnerability;
- in the "META_PG" structure, the metadata of a program $PG_k$ for mitigating the vulnerability $ID_{CVEk}$; and
- in the "META_HLP" structure, the metadata of two support functions HLPk1 and HLPk2 called by the program $PG_k$.

In the example in FIG. 3, the META_PG metadata of the mitigation program $PG_k$ include:

- the "NP" metadata corresponding to the name $PG_k$ of this program; and
- the "HK" metadata corresponding to the trigger point of the program $PG_k$ constituted here by the file opening system call open.

In the example of FIG. 3, the META_HLP metadata of the support function HLPk1 include:

- the "NH" metadata corresponding to the name HLPk1 of this support function;
- the "HSH" metadata comprising a hash "a0 . . . 65f" of this support function; and
- the "EP" metadata corresponding to an entry point DYNFUN in this support function, for example 4.

In the example of FIG. 3, the META_HLP metadata of the support function HLPk2 include:

- the "NH" metadata corresponding to the name HLPk2 of this support function
- the "HSH" metadata comprising a "c7 . . . 409" hash of this support function; and
- the "EP" metadata corresponding to an entry point DYNFUN in this support function; for example 2.

During a step F30, the installation module MINST verifies whether the support functions HLPk1 and HLPk2 necessary for the execution of the mitigation program $PG_k$ and identified in the description file $ID_{Fk}$ received at step E20 are already installed in the kernel KER.

In the embodiment described here, the verification module MINST performs this verification through a kernel interface of the kernel KER. This operation can be performed by querying a virtual file system, for example similar to the system Sysfs known to those skilled in the art and described particularly in the Linux manual (for example at the address https://man7.org/linux/man-pages/man5/sysfs.5.html).

In practice, generic support functions likely to be called by many mitigation programs can be preinstalled in the kernel KER.

In the exemplary embodiment described here, the support functions HLPk1 and HLPk2 are already installed in the kernel KER and the result of the test F30 is positive.

During a step F40, the installation module MINST downloads the mitigation program $PG_k$ identified in the description file $ID_{Fk}$ received at step F20. In the embodiment described here, this download is done from the security server $SRV_{SEC}$.

In the embodiment described here, this program (denoted $PG^S_k$) is downloaded in source code in the eBPF format.

During a step F50, the installation module MINST compiles the mitigation program $PG_k$.

During a step F60, the mitigation program $PG_k$ is linked with a header file HDF according to a link editing mechanism known to those skilled in the art, to obtain an executable mitigation program $PG^E_k$. In the embodiment described here, this header file HDF is stored in the rewritable non-volatile memory 14.

This header file HDF is updated each time a support function HLPk1 and HLPk2 is installed in the kernel KER.

Figure 4:
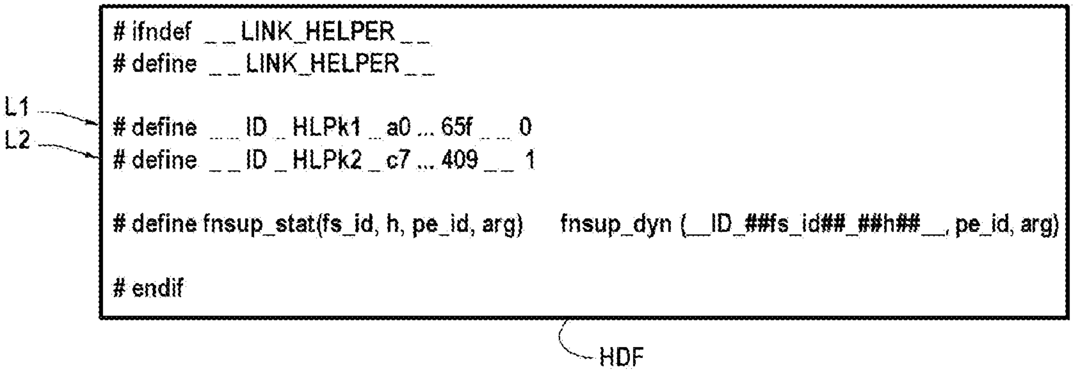
FIG. 4 represents a header file that can be used in one particular embodiment.

FIG. 4 illustrates an example of header file HDF by assuming that only the support functions HLPk1 and HLPk2 are installed in the kernel KER and that the function HLPk1 was installed before the function HLPk2.

In the example described here, the header file HDF includes:

- a first line L1 added when installing the support function HLPk1 in the kernel KER; and
- a second line L2 added when installing the support function HLPk2.

Each line L1, L2 includes:

- the character string "#define_ID_", concatenated
- to the name of the support function, that is to say to the character string "HLPk1", "HLPk2", concatenated
- to the character "_", concatenated
- to the hash of the support function, namely in this example "a0 . . . 65f" for the line L1 and "c7 . . . 409" for the line L2, concatenated
- to the character string "_", concatenated
- to a number corresponding to a position index of the support function in the memory of the kernel KER, 0 for the line L1 and 1 for the line L2.

The header file HDF includes, after the set of lines L1, L2, . . . corresponding to each of the support functions installed in the kernel KER, a line:

#define fnsup_stat(fs_id, h, pe_id, arg) fnsup_dyn (_ID_##fs_id ##_##h ##_, pe_id, arg)

Those skilled in the software art thus understand that if, for example, the mitigation file $PG_k$ includes in its source code the instruction

- fnsup_stat(HLPk1, a0 . . . 65f, 4, arg), the link editing step E60 translates this instruction:
  - in a first step into fnsup_dyn(_ID_HLPk1_a0 . . . 65f, 4, arg), then in a second step, into fnsup_dyn(0, 4, arg), because in the example of FIG. 4, into line L1, _ID_HLPk1_a0 . . . 65f_ is set to 0 where 4 corresponds to the entry point to be called in the support function HLPk1.

The executable form of the mitigation program $PG_k$, in binary, is stored in the non-volatile memory 14 of the equipment EQ for installation in a region ZPS of the kernel KER during a step F70 described subsequently.

In the embodiment described here, the function fnsup_stat is a static function that acts as a proxy to call the support functions $HLP_{i,j}$ installed in the kernel KER. In the embodiment described here, this function includes three parameters:

an identifier of the support function fs_id, valued at "0" in this example;

an entry point pe_id in the support function, valued at 4 in this example; and arguments valued here at arg.

In accordance with this embodiment, when the mitigation programs are loaded into the kernel (step F70 described later), a memory space is reserved for them, and the address of this memory space is associated with the support function identifier fs_id in a table TB of the kernel KER.

In the example of FIG. 1, the table TB of the kernel KER illustrates the situation in which the mitigation program $PG_k$ is installed at the address $@PG_k$, with a support function identifier valued at 0 so that the execution of the instruction fnsup_dyn(0, 4, arg) triggers the execution of the program $PG_k$ at the entry point 4, with the arguments arg.

Returning to step F30, if it turns out that at least one support function HLPk1 and HLPk2 identified in the description file is not installed in the kernel KER, the result of the test F30 is negative, and this support function must be downloaded (step H10) from the server $SRV_{SEC}$ and installed (step H20) in the region ZPS of the kernel KER.

In the embodiment described here, the support functions are downloaded in object code and intended to be linked with the object code of the mitigation program.

These download steps are performed by the administrator of the equipment EQ or by a module in the user space USR with administrator rights.

Once all the support functions necessary for the mitigation program $PG_k$ are installed in the kernel KER, this file can be compiled (step F50), linked (step F60) and in turn loaded into the kernel.

In the variant of embodiment described above, the mitigation program is downloaded in source code. As a variant, the mitigation program $PG_k$ is downloaded in the form of object code (denoted $PG^O{}_k$) and the compilation step F50 is not necessary. In one embodiment of this variant, the compilation of the mitigation program in source code uses the description file $IF_{Fk}$ of FIG. 3, and generates in addition to the object code $PG^O{}_k$, a table including a cell for each support function called by this mitigation program. The $k^{th}$ cell of this table is reserved to contain the identifier fs_id of the $k^{th}$ support function taken in the order of the description file $ID_{Fk}$. This table is downloaded at the same time as the object code $PG^O{}_k$, during step F40. At the time of the link edition (step F60), each cell k of the table is filled with the identifier $HLP_{k,1}$ of the $k^{th}$ support function.

It is important to recall that in this example, the mitigation program $PG_k$ aims to mitigate the vulnerability of the function F1 only and more precisely to block the effects of the file opening system call open( ) by the process p1( ) of this function F1.

To this end, and in the embodiment described here, the invention implements the security method described in document [1].

It is recalled that in this example, the user space USR includes a process p0( ) the software function F1 in the container C1 and another software function F2 in the container C2.

In other words, and particularly, the system call of the function open( ) by a process p2( ) of the function F2 must not be mitigated by the mitigation program $PG_k$.

In the embodiment described here, the processes of the user space USR are isolated using the known mechanism of namespaces. In a known manner, the operating system Linux proposes several namespaces (for example: Network, IPC, PID, User) . . . which can be used to isolate processes in a mechanism in which sets of processes are defined, so that the processes of a given set cannot see the resources used by another set of processes.

In the example described here:

the process p0 is respectively associated with different namespaces ENNETWORK0 (for the Network space), ENIPC0 (for IPC), ENIPD0 (for PID), ENUser0 (for User);

the processes of the container C1, in this case the process p1( ) are associated with different namespaces ENNETWORK1, ENIPC1, ENIPD1, ENUser1; and the processes of the container C2, in this case the process p2( ) are associated with different namespaces ENNETWORK2, ENIPC2, ENIPD2, ENUser2.

In the example described here, the process p2( ) calls, like the process p1( ) the file opening system call open( ) and the packet sending system call send( ).

In the example of FIG. 1, the process p0( ) does not call the system calls open( ) send( ).

In accordance with the mechanism described in document [1], the processes p0( ) p1( ) and p2( ) are also associated with a namespace ENSECURE dedicated to the security management.

In the embodiment described here, the process p0( ) is associated with the security management namespace ENSECURE0, the container C1 is associated with the security management namespace ENSECURE1, and the container C2 is associated with the security management namespace ENSECURE2.

Figure 5:
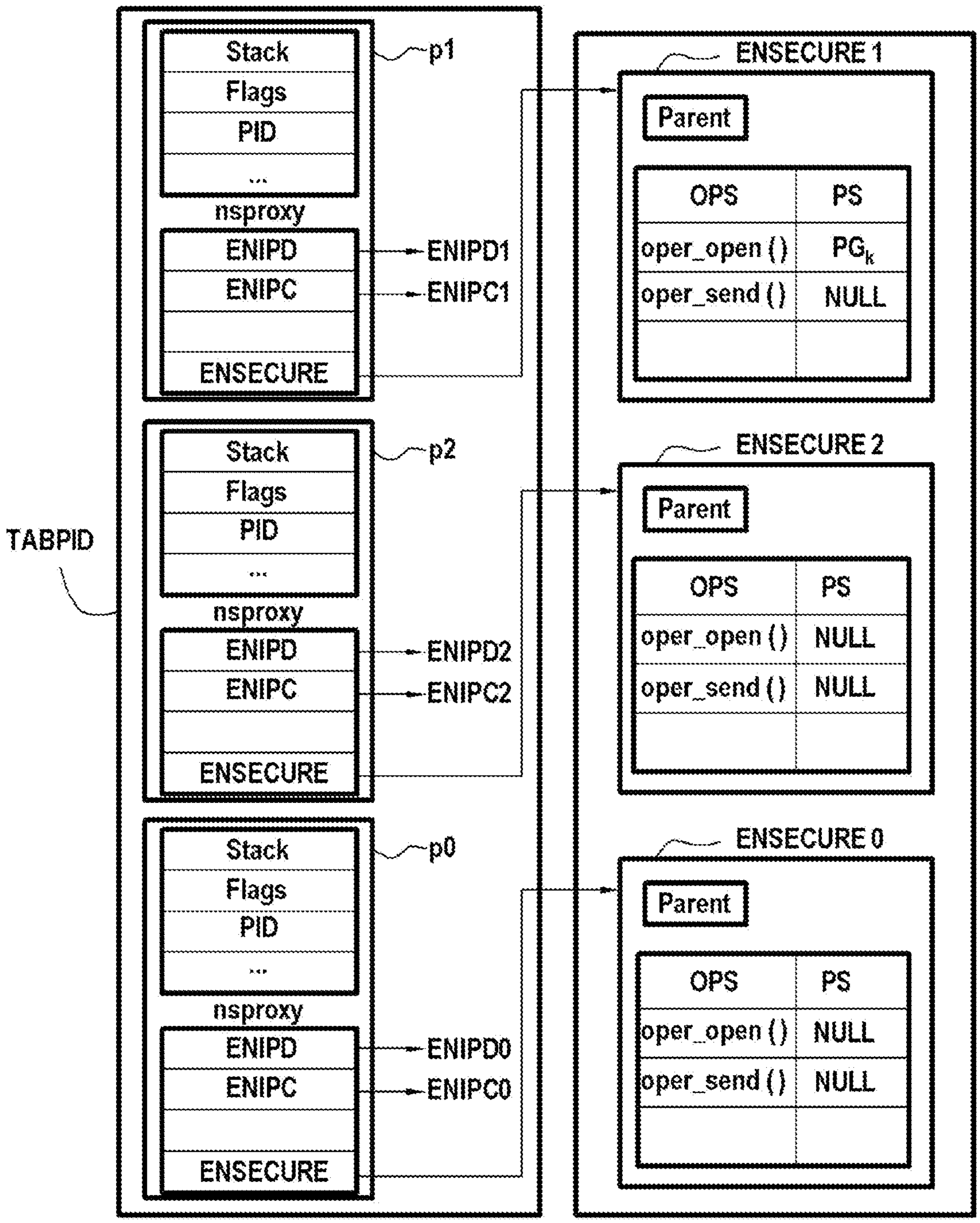
FIG. 5 represents a process table that can be used in one particular embodiment.

FIG. 5 represents a table TABPID of the processes stored in the kernel KER. In the kernel KER, a process consists of a structure including several fields making it possible to manage its life cycle such as its PID identifier, its flags, its stack, and a field nsproxy that includes pointers to namespaces.

Particularly, the field nsproxy includes a pointer ENSECURE to the namespace dedicated to security management associated with this process. This namespace defines a data structure that comprises in particular the security policy, for example the mitigation policy.

The namespace ENSECURE of a process includes a link to the namespace ENSECURE of the parent of that namespace of this process. In the example described here, ENSECURE1 and ENSECURE2 associated respectively with the containers C1 and C2 point to the namespace ENSECURE0 of the process p0.

The namespaces ENSECURE therefore form a tree.

In a manner known to those skilled in the art, a process can change the namespace to join the namespace of one of its child processes, for example by using the command unshare0.

From the user space USR, it is possible to access the identifier of a namespace but it is not possible to modify its structure. This characteristic advantageously makes it possible to prevent any modification or deactivation of a security or mitigation policy by a container.

In the exemplary embodiment described here, it is assumed that initially the processes have not defined any security or mitigation policy.

The context in which the mitigation program $PG_k$ has just been generated to mitigate the vulnerability $ID_{CVEk}$ of the function F1 by compilation and edition of links during steps F50 and F60, is now considered. The mitigation program $PG_k$ stored in the non-volatile memory 14 must be loaded into the security policy region ZPS of the kernel KER.

Very advantageously, the loading of a security policy, and particularly of a mitigation program, specific to a container in the memory of the kernel can be carried out at any moment of the life cycle of the container, not only at its initialization.

In the embodiment described here, the installation module MINST includes load_ps( ) instructions for loading (step F70) a mitigation program in the form of a compiled file eBPF in binary form in the region ZPS of the kernel KER. This function load_ps( ) consists in opening the eBPF file comprised in the non-volatile memory 14 and copying it to an interface with the kernel KER. As described above, this step comprises the allocation of a memory space in the region ZPS for this mitigation function, and the association of the address of this memory space with a support function identifier fs_id in a table TB of the kernel KER.

In the embodiment described here, this writing in the kernel interface triggers an event to store the mitigation program in the namespace of the process protected by this mitigation program, namely the process p1( ) in this example.

In the embodiment described here, the kernel KER includes a security control infrastructure ICS for managing security modules Linux, a security management module LinuxLSM1 and optionally at least one other security module LSM2, for example, a module SELinux or a module AppAmor.

Figures 6, 8:
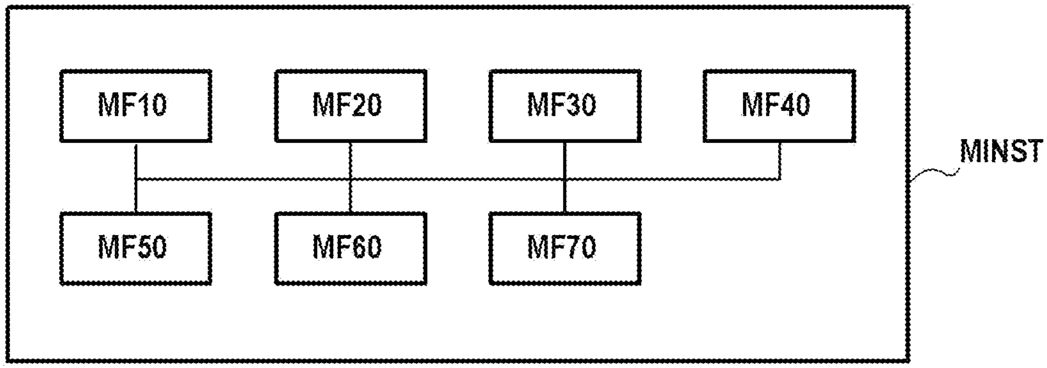
FIG. 6 represents a control table that can be used in one particular embodiment.
FIG. 8 represents the functional architecture of an installation module in accordance with one particular embodiment.

In the exemplary embodiment described here, the kernel KER includes a control table TABCTR which defines, for each sensitive operation OPS (file opening, packet sending on the network, etc.) whether or not the security module LSM1 wants to control these sensitive operations. This table TABCTR is represented in FIG. 6.

In the verification example described here, it is assumed that the security module LSM1 only wishes to verify the sensitive file opening operation.

Figure 7:
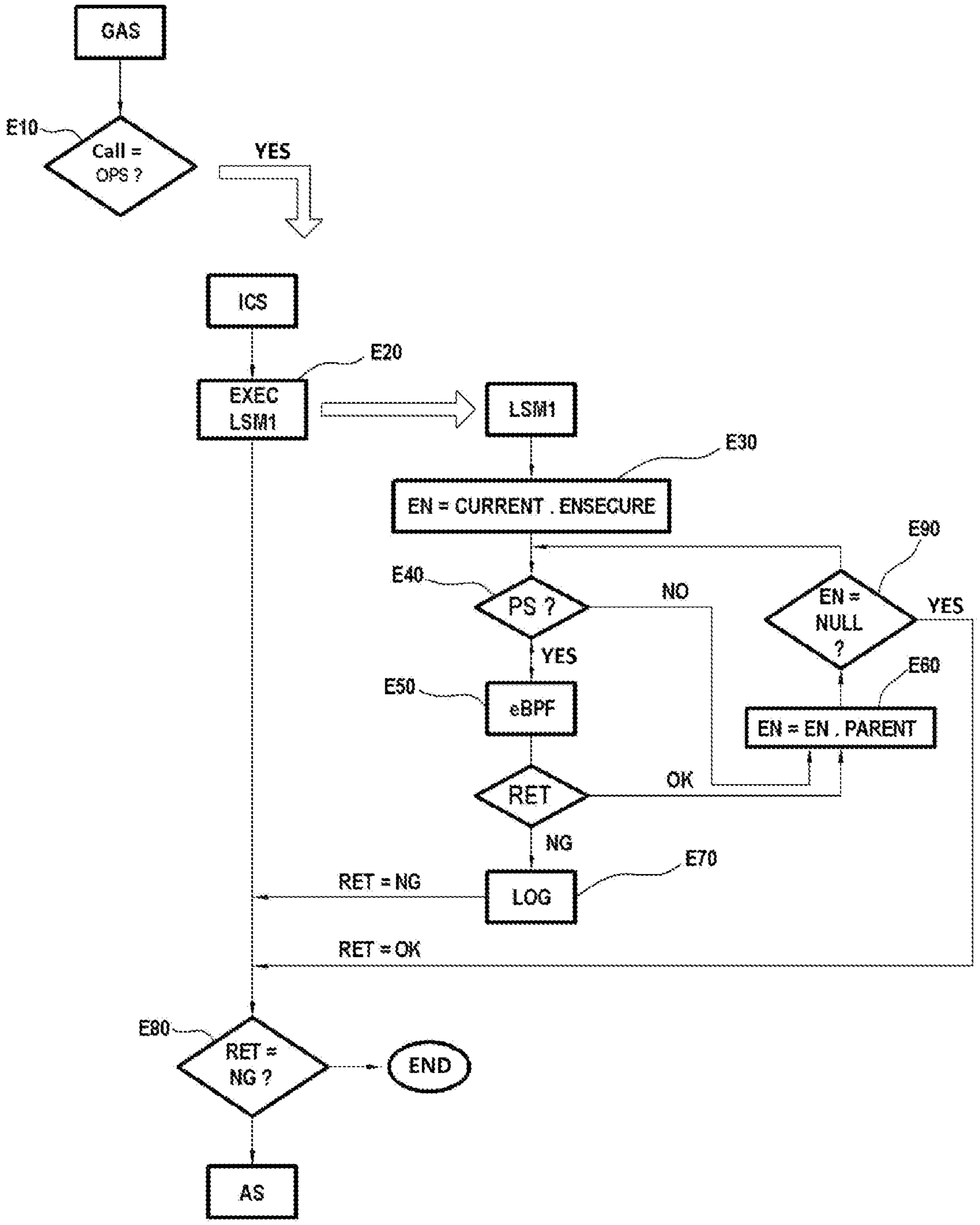
FIG. 7 represents in the form of a flowchart the main steps of a security method that can be implemented in one particular embodiment.

FIG. 7 represents in the form of a flowchart the main steps of a method implemented by the system call manager GAS, the security control infrastructure ICS (LSM framework) and by the security module LSM1.

In the exemplary embodiment described here, the system call manager GAS determines, during a step E10, whether a system call triggered by a process of the user space must perform a sensitive operation. If so, it triggers the Security Control infrastructure ICS of the Kernel KER.

The ICS infrastructure determines whether the sensitive operation OPS is listed in the table TABCTR.

In the exemplary embodiment described here, if a process wishes to perform the sensitive operation, send a packet (oper_send( ) or execute a new process in user space (oper_exec( ) by calling the function exec( ) as these sensitive operations are not verified by the security module LSM1, the result of the determination step is negative. These operations can nevertheless be verified by the security module LSM2, for example SELinux and a module AppAmor.

When the process p1( ) of the function F1 calls the file opening system call open( ) the ICS infrastructure determines that this sensitive operation is listed in the table TABCTR and it triggers the execution of the security module LSM1 during a step E20.

During a step E30, the security module LSM1 determines the namespace associated with the current process at the origin of this call. For this, it uses the current process from the table of the processes TABPID. This is namely the process p10.

The security module LSM1 then executes a loop to execute the policies of the namespace of the current process related to this sensitive operation. In one particular embodiment, the security module LSM1 then executes a loop to execute the policies of its ancestor namespaces if they exist.

During a step E40, the security module LSM1 determines whether the current namespace has defined one or more security policies to verify the validity of the sensitive operation.

This is the case if the file opening system call open( ) has been called by the process p1( ) but this is not the case if this system call open( ) were called by the process p20.

If this is the case, the concerned security module LSM1 executes during a step E50 the security policy or policies defined in the namespace dedicated to the security management ENSECURE of the current process for this sensitive operation.

In this case, the mitigation program $PG_k$ is executed and the file opening system call open( ) is blocked.

The security module LSM1 records this blocking in a log file FLOG of the kernel KER during a step E70 and sends a negative result RET to the security infrastructure ICS. This log file FLOG can be analyzed by the administrator by means of the administration tool ADM.

In the embodiment described here, a security policy returns a negative result RET if it detects a security problem (translating for example malicious or abnormal behavior) and a positive result if it does not detect any security problem.

If this value RET is positive, the security module determines, if it exists, the parent namespace of the namespace of the current process (step E60) and the loop is repeated.

When all security policies in the entire namespace tree structure have been executed with a positive result RET, the security module LSM1 sends a positive result RET to the security infrastructure ICS (test E90).

In the embodiment described here, if the security infrastructure ICS receives a positive result RET, it does not trigger any particular action and the system call is executed, unless an action is triggered by another security module LSM2, for example, a module SELinux or a module AppAmor.

In the embodiment described here, if the security infrastructure RET receives a negative result RET, the control infrastructure ICS triggers a security action AS during a step E80. This action can consist in destroying the process at the origin of the call and raising an alert in the log file FLOG.

In the embodiment described here, when no process remains in a namespace dedicated to security management, this namespace is destroyed automatically by the kernel. This operation destroys the security policies associated with these namespaces.

In the example described previously, the security method described in document [1] was used to install the mitigation program $PG_k$ so that it only mitigates the vulnerability CVEk of the function F1.

Other methods can be envisaged.

A first method consists in applying programmable policies eBPF by process hierarchy, these policies being applied via the Landlock LSM framework at the Linux security module (LSM) level as described in chapter 4 of document https://tel.archives-ouvertes.fr/tel-01762144/document.

A second method consists in applying at the system call level policies in the form of a cBPF program applicable using a security module Seccomp-BPF.

In both cases, the policies are stored in dedicated structures of the kernel. They identify a process or a process hierarchy (by pid, inode number of the executable, . . . ) and are called during specific events (system calls, LSM operation, . . . )

FIG. 8 represents the functional architecture of a module MINST for installing a mitigation program in the kernel of an equipment, in accordance with one particular embodiment. It includes:

- a sub-module MF10 for sending a request including a unique identifier of a vulnerability to a security server;
- a sub-module MF20 for obtaining, in response to this request, a description file for describing the mitigation program;
- a sub-module MF30 to check whether a support function identified in a description file is recorded in the kernel;
- a sub-module MF40 for downloading a mitigation program in source code or object code,
- a compilation sub-module MF50;
- a link edition sub-module MF60; and
- a sub-module MF70 for installing the executable code of the mitigation program in the kernel of the equipment.

[1]: Snappy: Programmable Kernel-Level Policies for Containers, Maxime Bélair, Sylvie Laniepce, Jean-Marc Menaud, Mars 2021, ACM ISBN 978-1-4503-8104-8/21/03

The invention claimed is:

1. A method for installing a mitigation program in a kernel of computing equipment to mitigate a vulnerability that may affect a function to be protected, the function running in a user space of said computing equipment, the method comprising:

- sending a request including a unique identifier of said vulnerability to a security server;
- obtaining, in response to the request, a description file for describing said mitigation program;
- obtaining object code of the mitigation program identified in said description file;
- editing a link to resolve at least one symbol of the object code in order to generate executable code of said mitigation program specific to said computing equipment; and
- installing the executable code in the kernel of said computing equipment, said computing equipment including means to ensure that said mitigation program mitigates said vulnerability only for said function to be protected.

2. The method of claim 1, further comprising:

- downloading source code of said mitigation program from an address included in said description file; and
- compiling said source code to obtain said object code.

3. The method of claim 2, wherein the source code is an eBPF language program.

4. The method of claim 1, further comprising downloading said object code from an address included in said description file.

5. The method of claim 1, wherein said description file includes an identifier of at least one support function that can be called by said mitigation program when executed by a processor of said computing equipment.

6. The method of claim 5, further comprising, before the editing of the link to resolve at least one symbol of the object code, verifying that said at least one support function is installed in said kernel.

7. The method of claim 6, wherein verifying that said at least one support function is installed in said kernel includes verifying a hash of said support function included in said description file.

8. The method of claim 5, wherein source code of the mitigation program includes a static function for calling said support function, a call to said static function being replaced by a call to a dynamic function during the editing of the link to resolve at least one symbol of the object code.

9. The method of claim 5, wherein the editing of the link to resolve at least one symbol of the object code uses a header file configured to allow substitution of a unique identifier obtained from the identifier of the support function by an index representative of a location of the support function in the kernel of the computing equipment.

10. The method of claim 9 wherein said unique identifier, obtained from the identifier of the support function, includes a hash of the support function.

11. The method of claim 1, said method further comprising:

- recording said mitigation program as a security policy in a kernel namespace dedicated to security management, this kernel namespace being associated with at least one process of said function to be protected, and
- wherein said kernel implements a security method for securing a system call triggered by a current process of said user space before executing at least one operation triggered by said at least one system call, said security method including:
  - obtaining at least one kernel namespace dedicated to security management associated with said current process;
  - determining whether said at least one namespace includes a security policy; and
  - executing said security policy.

12. A module for installing a mitigation program in a kernel of computing equipment to mitigate a vulnerability that may affect a function to be protected, the function running in a user space of said computing equipment, the module comprising at least one non-transitory storage medium and processor configured for:

- sending a request including a unique identifier of said vulnerability to a security server;
- obtaining, in response to the request, a description file for describing said program;
- obtaining object code of the mitigation program identified in said description file;
- editing a link to resolve at least one symbol of the object code in order to generate executable code of said mitigation program specific to said computing equipment (EQ); and
- installing the executable code in the kernel of said computing equipment, said computing equipment including means to ensure that said mitigation program mitigates said vulnerability only for said function to be protected.

13. An equipment including the user space, the kernel and the module of claim 12 for installing the mitigation program in the kernel to mitigate the vulnerability that may affect the function to be protected, the function running in the user space, the equipment comprising at least one non-transitory storage medium and processor configured for:

recording said mitigation program as a security policy in a kernel namespace dedicated to security management, this kernel namespace being associated with at least one process of said function to be protected, the kernel comprising means for securing at least one system call triggered by a current process of said user space before executing at least one operation triggered by said at least one system call, said means for securing at least one system call being configured to:

obtain at least one kernel namespace dedicated to security management associated with said current process;

determine whether said at least one namespace includes a security policy; and execute said security policy.

* * * * *